US011635015B2

(12) United States Patent
Stephens et al.

(10) Patent No.: US 11,635,015 B2
(45) Date of Patent: Apr. 25, 2023

(54) COOLANT CONTROL VALVE (71) Applicant: Norgren GT Development LLC, Auburn, WA (US)

(72) Inventors: Charles E. Stephens, Auburn, WA (US); David De Leon, Auburn, WA (US); Dan Green, Auburn, WA (US)

(73) Assignee: Norgren GT Development LLC, Auburn, WA (US)

( * ) Notice: Subject to any disclaimer, the term of this patent is extended or adjusted under 35 U.S.C. 154(b) by 543 days.

(21) Appl. No.: 16/674,218

(22) Filed: Nov. 5, 2019

(65) Prior Publication Data

US 2021/0131334 A1    May 6, 2021

(51) Int. Cl.
*F01P 7/14* (2006.01)
*F01N 3/02* (2006.01)
*F01P 3/12* (2006.01)
*F16K 31/122* (2006.01)
*F01N 3/08* (2006.01)

(52) U.S. Cl.
CPC .............. *F01P 7/14* (2013.01); *F01N 3/0205* (2013.01); *F01N 3/0828* (2013.01); *F01P 3/12* (2013.01); *F16K 31/1221* (2013.01); *F01P 2007/146* (2013.01)

(58) Field of Classification Search
CPC .......... F01P 7/14; F01P 3/12; F01P 2007/146; F01N 3/0205; F01N 3/0828; F16K 31/1221
USPC ..................................................... 123/41.08
See application file for complete search history.

(56) References Cited

U.S. PATENT DOCUMENTS

| 686,322 | A | | 11/1901 | Colas | |
|---|---|---|---|---|---|
| 2,412,490 | A | * | 12/1946 | Biggle | F16K 31/385 236/80 R |
| 2,694,414 | A | * | 11/1954 | Seyferth | B24B 55/02 251/84 |
| 3,027,912 | A | * | 4/1962 | Carr | F22B 37/446 251/260 |
| 3,086,547 | A | * | 4/1963 | Rodgers | A62C 99/009 251/28 |

(Continued)

FOREIGN PATENT DOCUMENTS

| CN | 101663524 B | 7/2012 |
|---|---|---|
| EP | 1197692 B1 | 3/2004 |

*Primary Examiner* — Hung Q Nguyen
*Assistant Examiner* — Anthony Donald Taylor, Jr.
(74) *Attorney, Agent, or Firm* — McDonnell Boehnen Hulbert & Berghoff LLP (57) ABSTRACT A fluid actuated normally closed coolant control valve. The valve comprises a valve housing, an inlet port, the inlet port configured for fluid communication with either a coolant source or a heat exchanger of a DEF tank; an outlet port configured for fluid communication with the other of the heat exchanger of a DEF tank or the coolant source; a valve chamber, a valve and an actuator configured to actuate the valve. The actuator is a fluid actuated piston. The valve is biased to a closed condition in which the flow of coolant from the inlet port to the outlet port is prevented by the valve. The valve is actuatable to an open condition in which the flow of coolant from the inlet port to the outlet port is permitted, and the valve is withdrawn from the valve chamber, wherein the flow factor for the valve is greater than 1.5.

16 Claims, 6 Drawing Sheets (56) References Cited

U.S. PATENT DOCUMENTS

| | | | | |
|---|---|---|---|---|
| 3,651,829 | A * | 3/1972 | Frantz | F16K 17/168 |
| | | | | 137/522 |
| 3,941,035 | A * | 3/1976 | Mueller | F02B 37/186 |
| | | | | 92/36 |
| 3,981,478 | A | 9/1976 | Lundsgart | |
| 4,117,706 | A | 10/1978 | Lami | |
| 4,361,170 | A | 11/1982 | Peloza | |
| 4,390,049 | A | 6/1983 | Albertson | |
| 4,469,133 | A | 9/1984 | Boesing | |
| 4,478,249 | A * | 10/1984 | Fleischmann | F16K 11/078 |
| | | | | 137/454.6 |
| 4,621,656 | A | 11/1986 | Ichimaru | |
| 4,712,576 | A * | 12/1987 | Ariizumi | F16K 31/003 |
| | | | | 92/182 |
| 4,754,776 | A * | 7/1988 | McKee | F16K 11/044 |
| | | | | 92/49 |
| 4,887,643 | A * | 12/1989 | Tomlin | F16K 11/065 |
| | | | | 137/625.68 |
| 4,930,455 | A | 6/1990 | Creed | |
| 5,184,773 | A * | 2/1993 | Everingham | B60H 1/00485 |
| | | | | 137/625.5 |
| 5,195,718 | A | 3/1993 | May | |
| 5,409,040 | A | 4/1995 | Tomlin | |
| 5,443,241 | A * | 8/1995 | Odaira | F01P 7/14 |
| | | | | 137/625.5 |
| 5,467,960 | A | 11/1995 | Morris | |
| 5,850,853 | A * | 12/1998 | Ohmi | C23C 16/45561 |
| | | | | 251/30.01 |
| 5,934,642 | A | 8/1999 | Pearson | |
| 6,109,534 | A * | 8/2000 | Ito | B60H 1/00878 |
| | | | | 237/12.3 B |
| 6,155,296 | A | 12/2000 | Roman | |
| 6,234,586 | B1 | 5/2001 | Davis | |
| 6,688,333 | B2 * | 2/2004 | McLane | F16K 11/0856 |
| | | | | 123/41.1 |
| 6,695,217 | B2 * | 2/2004 | Leu | G05D 23/1393 |
| | | | | 236/DIG. 2 |
| 6,745,995 | B2 * | 6/2004 | Hu | F01P 7/167 |
| | | | | 123/41.08 |
| 6,799,631 | B2 | 10/2004 | Acre | |
| 7,108,241 | B2 * | 9/2006 | Yoshino | F16K 41/12 |
| | | | | 251/335.2 |
| 7,343,882 | B2 * | 3/2008 | Pipkorn | F01P 7/167 |
| | | | | 123/41.1 |
| 7,444,962 | B2 | 11/2008 | Engelin | |
| 7,506,664 | B2 | 3/2009 | Norris | |
| 7,878,479 | B2 * | 2/2011 | Yamamoto | F16K 31/1262 |
| | | | | 251/61.4 |
| 8,291,870 | B2 | 10/2012 | Moffat et al. | |
| 8,375,970 | B2 * | 2/2013 | Lautzenheiser | E03C 1/04 |
| | | | | 137/12 |
| 8,387,659 | B2 | 3/2013 | Hunnicutt | |
| 8,910,659 | B2 * | 12/2014 | Rub | F16K 31/383 |
| | | | | 137/596.2 |
| 8,931,260 | B2 | 1/2015 | Minezawa et al. | |
| 9,145,978 | B2 * | 9/2015 | Mesner | F16K 31/406 |
| 9,222,490 | B2 | 12/2015 | Fishwick et al. | |
| 9,441,744 | B2 * | 9/2016 | Sheppard | F16K 11/0716 |
| 9,631,547 | B2 | 4/2017 | Porras | |
| 9,797,288 | B2 | 10/2017 | Darr et al. | |
| 10,024,214 | B2 | 7/2018 | Chini | |
| 2007/0284003 | A1 * | 12/2007 | Hansen | F16K 31/363 |
| | | | | 137/269 |
| 2010/0224804 | A1 * | 9/2010 | Sneh | F16K 31/1221 |
| | | | | 251/30.01 |
| 2012/0160934 | A1 * | 6/2012 | Ponnathpur | F01N 3/2066 |
| | | | | 239/289 |
| 2012/0186677 | A1 * | 7/2012 | Wetzel | F01N 3/208 |
| | | | | 137/624.27 |
| 2018/0230880 | A1 * | 8/2018 | Evans | F01N 3/208 |
| 2019/0101070 | A1 * | 4/2019 | Mumford | G05D 16/107 |
| 2019/0128441 | A1 | 5/2019 | Zahe | |
| 2020/0103042 | A1 * | 4/2020 | Kalyanasundaram | F16K 17/10 |
| 2020/0264147 | A1 * | 8/2020 | Joshi | F01N 3/0814 |

* cited by examiner

COOLANT CONTROL VALVE

TECHNICAL FIELD

The present disclosure relates to a normally closed coolant control valve. Particularly, but not exclusively, the disclosure relates to a fluid actuated valve. Aspects of the invention relate to a fluid actuated normally closed coolant control valve and to a coolant control system for a vehicle.

BACKGROUND

Conventional diesel-powered vehicles (trucks, earthmoving equipment, tractors, etc.) utilize an emissions control device that injects Diesel Emission Fluid (DEF) into the exhaust stream to reduce the presence of nitrous oxide. This DEF will freeze at temperatures below 12 degrees Fahrenheit (−11 degrees Centigrade). Thus, when operating such vehicles in relatively cold environments, the tank containing the DEF reserve must be heated. To heat the tank, thermal management fluid or coolant is allowed to flow via a fluid channel into a heat exchanger in thermal contact with the tank.

To control the flow of the coolant, a coolant control valve is used to open to the fluid channel into the tank and heat the DEF.

Known coolant control valves comprise electrically actuated valves, which use a solenoid.

Furthermore, known coolant control valves have flow factors ranging from approximately 0.8 to 1.2 $K_v$.

Flow factor is defined by the formula, $$K_v = Q\sqrt{\frac{SG}{\Delta P}}$$

Where:

$K_v$ is the flow factor (expressed in $[m^3 \cdot h^{-1} \cdot bar^{-0.5}]$),

Q is the flowrate (expressed in cubic metres per hour $[m^3/h]$),

SG is the specific gravity of the fluid (for water=1), $\Delta P$ is the differential pressure across the device (expressed in [bar]).

A simplified version of the definition is that the flow factor of a valve indicates "The water flow in $m^3/h$, at a pressure drop across the valve of 1 $kg/cm^2$ when the valve is completely open." The complete definition includes that the flow medium must have a specific gravity of 1000 $kg/m^3$ and a kinematic viscosity of 10-6 $m^2/s$. e.g. water at room temperature.

Yet furthermore, known coolant control valves have limited debris tolerances. This may be quantified by the approximate size of debris or particulates, within the closed loop coolant control system that may be tolerated by the valve and valve seat before leaking occurs. Known electrically actuated coolant control valves have a debris tolerance of 1.8 mm or less. This can cause an emissions related failure event for the vehicle that requires repair. The leakage through a valve in a closed condition may also result in overheating the DEF.

The present invention aims to solve one or more of the above problems.

SUMMARY OF THE INVENTION

Aspects and embodiments of the invention provide a fluid actuated normally closed coolant control valve, a coolant control system for a vehicle, a Diesel Emission Fluid (DEF) system for a diesel-powered vehicle, and a vehicle having a Diesel Emission Fluid (DEF) system as claimed in the appended claims.

According to an aspect of the invention, there is provided a fluid actuated coolant control valve comprising: a valve housing; an inlet port defined within the valve housing, the inlet port configured for fluid communication with one of a coolant source or a heat exchanger of a DEF tank; an outlet port defined within the valve housing, the outlet port configured for fluid communication with the other of the heat exchanger of a DEF tank or the coolant source; a valve chamber fluidly connecting the inlet port and the outlet port; a valve; and an actuator configured to actuate the valve, wherein the actuator comprises a fluid actuated piston; and wherein the valve is normally closed valve and biased by a biasing element to a valve closed condition in which the flow of coolant from the inlet port to the outlet port is prevented by the valve in the valve chamber; wherein the valve is actuatable to a valve open condition in which the flow of coolant from the inlet port to the outlet port is permitted and the valve is withdrawn from the valve chamber, and wherein the flow factor for the valve is greater than 1.5.

By actuating the coolant valve using a fluid rather than a solenoid, the coolant valve may provide increased flow rates whilst remaining compact.

The increased flow factor of the valve of the present invention enables a greater system flow rate together with a reduced thaw time of the DEF. Additionally, or alternatively, the increased flow factor of the valve of the present invention enables the use of smaller hoses and plumbing for the coolant circuit.

Because the valve is withdrawn from the valve chamber in the valve open condition, the valve does not interfere with the flow of coolant, further supporting the increased flow factor.

The fluid actuated nature of the valve of the present invention enables a far greater debris tolerance than the solenoid actuated valves of the prior art. For valves with the inlet port having a bore size of 8 mm and outlet port having a bore size of 7 mm, the debris tolerance may be approximately 7 mm, as the valve member is withdrawn from the valve chamber in the valve open condition and thus provides no interference. This greater debris tolerance alleviates the concern of the valve leaking when closed.

The actuation fluid may be pneumatic pressure.

The valve may have a flow factor of greater than or equal to 1.7.

The biasing element may be a coil spring.

The valve housing may be formed from a single piece.

The valve housing may be closed by a lid.

The valve housing may be closed by a lid and the lid may comprise a vent tube. By positioning the vent tube in the lid, the valve body may be used as a weep reservoir such that the valve exhibits no signs of leakage through its normal working life. Furthermore, by positioning the vent tube in the lid, orientation control of the vent tube is provided independent to the valve housing.

Alternatively, the valve housing may comprise a vent tube.

The valve housing may comprise a vent tube, wherein the vent tube is provided between the inlet port and a pressurised fluid pilot port.

The inlet port may have a bore size that is different to a bore size of the outlet port. The inlet port may have a bore size that is larger than a bore size of the outlet port.

The valve housing may be plastic. The valve housing may be closed by a lid and the lid may be plastic. The piston may be plastic. By providing the housing and other major components such as the lid and piston, the valve has an insulative effect. This ensures that the heat energy delivered by the coolant is focused on thawing and maintaining the temperature of the DEF, rather than dissipating into the atmosphere via the valve housing.

According to another aspect of the invention, there is provided a coolant control system for a vehicle, the coolant control system comprising a fluid actuated coolant control valve, a coolant source and heat exchanger of a Diesel Emission Fluid (DEF) tank, wherein the control valve comprises: a valve housing; an inlet port defined within the valve housing, the inlet port configured for fluid communication with one of the coolant source or the heat exchanger of the DEF tank; an outlet port defined within the valve housing, the outlet port configured for fluid communication with the other one of the heat exchanger of a DEF tank or the coolant source; a valve chamber fluidly connecting the inlet port and the outlet port; a valve; and an actuator configured to actuate the valve, wherein the actuator comprises a fluid actuated piston; and wherein the valve is normally closed and biased by a biasing element to a valve closed condition in which the flow of coolant from the inlet port to the outlet port is prevented by the valve in the valve chamber; wherein the valve is actuatable to a valve open condition in which the flow of coolant from the inlet port to the outlet port is permitted and the valve is withdrawn from the valve chamber, and wherein the flow factor for the valve is greater than 1.5.

According to yet another aspect of the invention, there is provided a Diesel Emission Fluid (DEF) system for a diesel-powered vehicle having a coolant control valve comprising: a valve housing; an inlet port defined within the valve housing, the inlet port configured for fluid communication with one of a coolant source or a heat exchanger of a DEF tank; an outlet port defined within the valve housing, the outlet port configured for fluid communication with the other one of the heat exchanger of a DEF tank or the coolant source; a valve chamber fluidly connecting the inlet port and the outlet port; a valve; and an actuator configured to actuate the valve, wherein the actuator comprises a fluid actuated piston; and wherein the valve is normally closed and biased by a biasing element to a valve closed condition in which the flow of coolant from the inlet port to the outlet port is prevented by the valve in the valve chamber; wherein the valve is actuatable to a valve open condition in which the flow of coolant from the inlet port to the outlet port is permitted and the valve is withdrawn from the valve chamber, and wherein the flow factor for the valve is greater than 1.5.

According to yet a further aspect of the invention, there is provided a vehicle having a Diesel Emission Fluid (DEF) system, the system having a coolant control valve comprising: a valve housing; an inlet port defined within the valve housing, the inlet port configured for fluid communication with one of a coolant source or a heat exchanger of a DEF tank; an outlet port defined within the valve housing, the outlet port configured for fluid communication with the other one of the heat exchanger of a DEF tank or the coolant source; a valve chamber fluidly connecting the inlet port and the outlet port; a valve; and an actuator configured to actuate the valve, wherein the actuator comprises a fluid actuated piston; and wherein the valve is normally closed and biased by a biasing element to a valve closed condition in which the flow of coolant from the inlet port to the outlet port is prevented by the valve in the valve chamber; wherein the valve is actuatable to a valve open condition in which the flow of coolant from the inlet port to the outlet port is permitted and the valve is withdrawn from the valve chamber, and wherein the flow factor for the valve is greater than 1.5.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A. Diesel Emission Fluid (DEF) System

Figure 1:
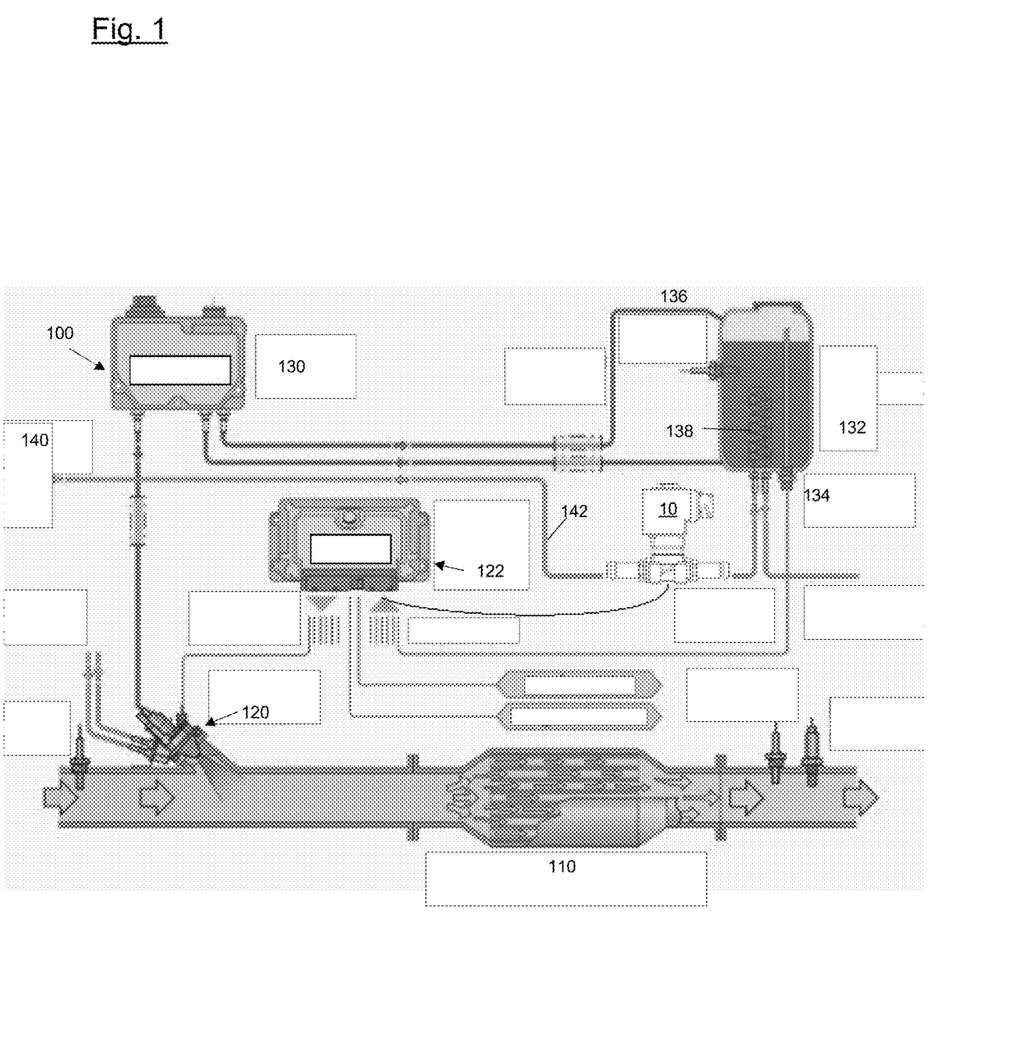
FIG. 1 is schematic vehicle DEF system including the valve of the present invention.
Figure 2:
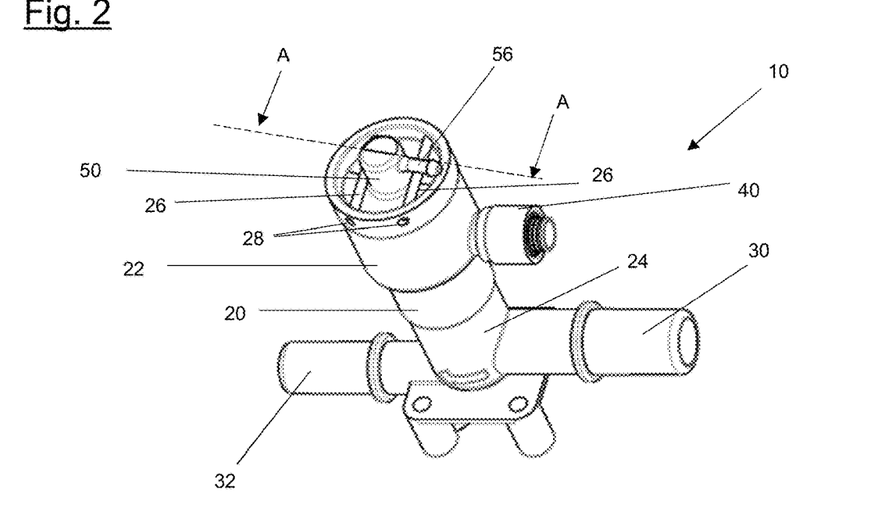
FIG. 2 is a perspective view of the valve of the present invention.
Figure 3:
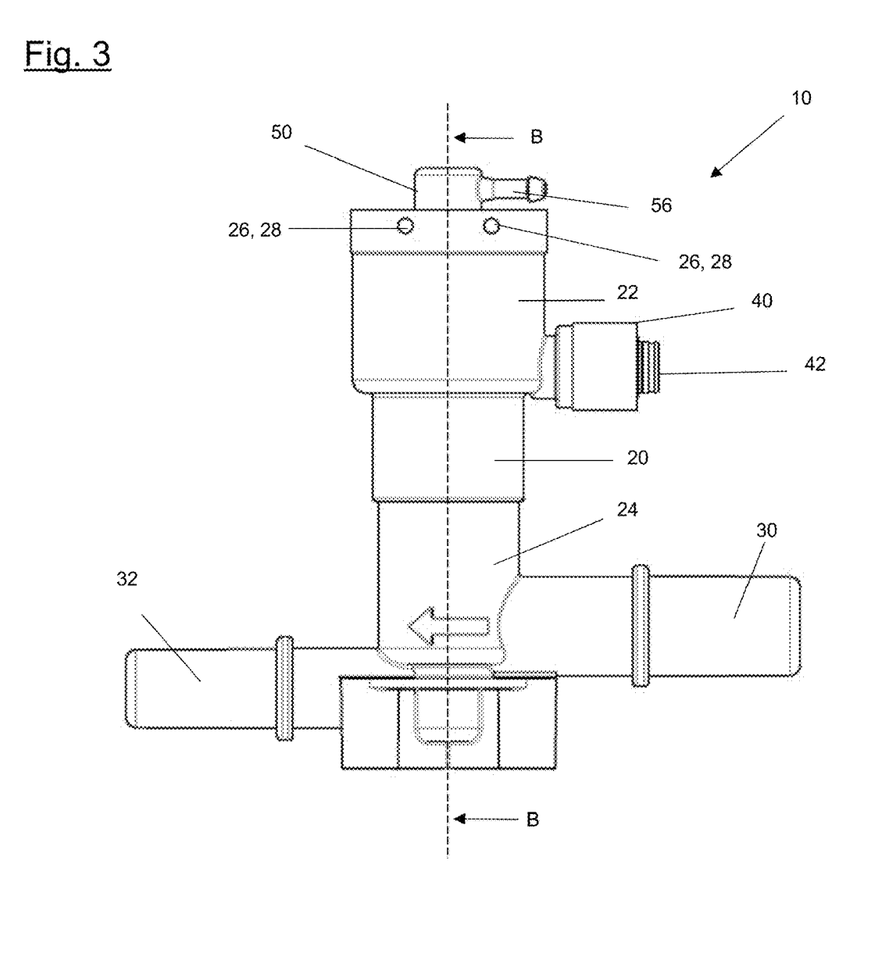
FIG. 3 is a front elevation of the valve of FIG. 2.
Figure 4:
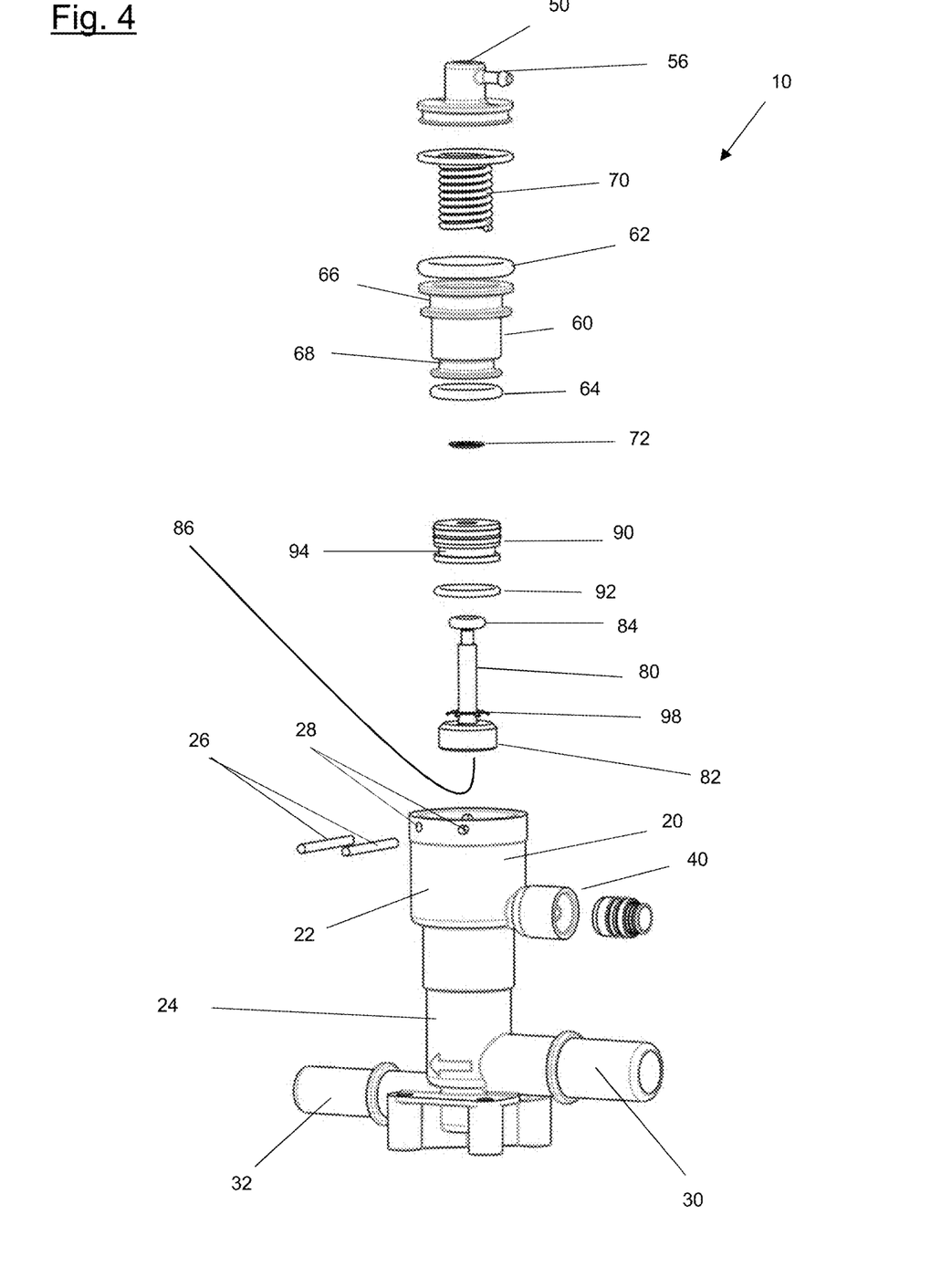
FIG. 4 is an exploded view of the valve of FIG. 2.

A Diesel Emission Fluid (DEF) system for a diesel-powered vehicle is shown in FIG. 1. The DEF system 100 is arranged to provide DEF upstream of a SCR catalytic converter 110 using a dosing module 120. The dosing module 120 injects DEF into the exhaust stream to reduce the presence of nitrous oxide. The dosing module 120 is controlled by a dosing control unit 122. A DEF supply module 130 is fluidly connected to a DEF tank 132. The DEF tank includes a level sensor 134 and a temperature sensor 136. DEF will freeze at temperatures below 12 degrees Fahrenheit (−11 degrees Centigrade). To thermally manage the temperature of the DEF, a heat exchanger 138 is provided in the DEF tank 132. The heat exchanger 138 may comprise at least one fluid conduit immersed in the DEF held within the DEF tank 132. Thermal management fluid, or coolant is supplied from a coolant source 140 to the heat exchanger 138 via a fluid pathway 142. Fluid pathway 142 may comprise hoses or associated plumbing and is part of the closed-circuit coolant system. Flow of coolant along fluid pathway 142 and hence to the heat exchanger 138 is regulated by the valve 10. The valve is actuated using pilot pressure from the fluid source (not shown). The valve may be controlled by the dosing control unit 122. In an alternate arrangement, the valve 10 may be positioned downstream of the DEF tank 132, rather than upstream as shown in FIG. 1.

B. Coolant Control Valve

Referring to FIGS. 2 to 6, a valve 10 is shown.

The valve 10 comprises a substantially cylindrical valve housing 20. The valve housing 20 is hollow, having inside wall 27. The valve housing 20 has an actuator portion 22 and a coolant flow portion 24.

The coolant flow portion 24 has an inlet port 30 and an outlet port 32. The inlet port 30 and outlet port 32 are fluidly connected by a valve chamber 36 provided in the coolant flow portion 24 of the valve housing 20.

In an exemplary valve of the present invention, the inlet port 30 has a bore size of approximately 8 mm. The outlet port 32 has a bore size of approximately 7 mm. The valve chamber 36 has a minimum orifice size of approximately 10.5 mm. The limiting flow area is therefore the bore diameter of the outlet port 32. The flow factor, $K_v$ through the valve chamber is $1.62$ $m^3.h^{-1}.bar^{-0.5}$. The debris tolerance is also a factor of the limiting flow area, such that the debris tolerance of the exemplary valve is approximately 7 mm.

The skilled person will appreciate that other sized outlet ports may be used. An increase in the limiting flow area will result therefore in increases in the flow factor, $K_v$ through the valve chamber, and likewise an increase in the debris tolerance.

The actuator portion 22 has a pilot port or pilot connector 40. A pilot fitting assembly 42 is housed within the pilot connector 40. The pilot fitting assembly 42 may be a push to fit connector.

The actuator portion 22 of the valve includes a lid 50, a piston 60, a spring 70, a stem 80, a poppet 82 and a stem guide 90.

The lid 50 closes the open end of the valve housing 20 to define a piston chamber 61 therein. An O-ring seal 52 seals the lid 50 to the inside wall 27 of the valve housing 20. The seal 52 is retained within a groove 54 provided on an outer surface of the lid 50. A vent tube 56 is provided in an upper portion of the lid 50. During installation of the valve 10, a rubber hose or similar is connected to the vent tube 56 so as to direct any weep away from the valve 10, and to prevent ingress of water or debris external to the coolant system. A pair of lid pins 26 bear against an upper surface of the lid 50. The lid pins 26 are sized to pass through a pair of apertures 28 provided in the actuator portion 22 of the valve housing 20. The lid 50 is hollow, with an annular shoulder 58 defined on an inside surface in a lower portion of the lid 50.

The piston 60 is mounted for linear reciprocation within actuator portion 22 of the valve housing 20. A large O-ring seal 62 seals an upper portion of the piston 60 to the inside wall 27 of the valve housing 20. A small O-ring seal 64 seals a lower portion of the piston 60 to the inside wall 27 of the valve housing 20. Both seals 62, 64, are retained within respective grooves 66, 68 provided on an outer surface of the piston 60.

The piston 60 is hollow with a spring 70 arranged therein. The spring 70 bears upon an annular shoulder provided on an inner surface of the piston 60. The spring 70 also bears upon the annular shoulder 58 of lid 50.

The stem 80 is coupled at its upper end to the piston 60 by a poppet retainer 72. The stem 80 passes through an aperture at the lower end of the piston 60 and interlocks with the poppet retainer 72. The stem 80 is coupled at its lower end to a poppet 82. The poppet 82 is the valve member. The poppet 82 is sized to move linearly within the valve chamber 36. The poppet 82 is provided with a sealing bead 86 on a lower surface of the poppet 82.

The stem 80 is slidably coupled to a bushing or stem guide 90. The stem guide 90 is coupled to the inside wall 27 of the valve housing 20. An O-ring seal 92 seals the stem guide 90 to the inside wall 27 of the valve housing 20. The seal 92 is retained within a groove 94 provided on an outer surface of the stem guide 90. An O-ring seal 84 seals the stem 80 to stem guide 90. The seal 84 is retained within a stepped bore 96 provided on an inner surface of the stem guide 90, and by a stem O-ring retainer 98.

The valve inlet port 30 is in fluid communication with the coolant source 140. The valve outlet port 32 is in fluid communication with the DEF tank 132. In an alternate arrangement, the valve inlet port 30 may be in fluid communication with the DEF tank 132, downstream and the valve outlet port 32 may be in fluid communication with the coolant source. The stem 80 is configured to displace the poppet 82. The stem guide 90 is configured to guide the valve stem 80 in a substantially linear direction. The poppet 82 is configured to prevent the flow of coolant from the coolant source 140 to the DEF tank 132. For example, the poppet 82 is configured to prevent the flow of coolant when pressed against the valve chamber seat 38 by action of the spring 70. The piston 60 is configured to draw poppet 82 away from the valve chamber seat 38, against the action of the spring 70, so as to allow coolant flow.

An actuation chamber 44 is formed in the valve housing 20 between the large O-ring seal 62 of the piston 60 and the small O-ring seal 64 of the piston 60. The actuation chamber 44 is in fluid communication to a source of fluid pressure via the pilot fitting assembly 42 housed within the pilot connector 40. The pilot fitting assembly 42 is a push to fit connection arrangement.

The valve housing 20, lid 50 and piston 60 may be made from plastic. The valve housing 20 may be injection molded. The poppet 82 may be made of rubber, over-molded to the stem 80. The stem guide 90 may be made of brass. The stem guide 90 may be machined.

C. Valve Conditions

The valve 10 is a 2/2-way valve, having two ports and two valve conditions—open and closed.

The valve 10 is a normally closed valve. The spring 70 bears upon an annular shoulder provided on an inner surface of the piston 60 and the annular shoulder 58 of lid 50. Because the lid 50 is restricted from moving by the lid pins 26, the piston 60 is forced downwards in the piston chamber 61, which in turn forces stem 80 and poppet 82 downwards until the sealing bead 86 of poppet 82 engages with valve chamber seat 38 to provide a fluid tight seal in the valve 10 closed condition.

The spring 70 maintains the valve 10 in the closed condition until the piston force overcomes the spring force. Without pressure applied, the valve 10 does not allow the flow of coolant, with pressure applied the valve 10 will open and allow the flow of coolant.

Figure 5:
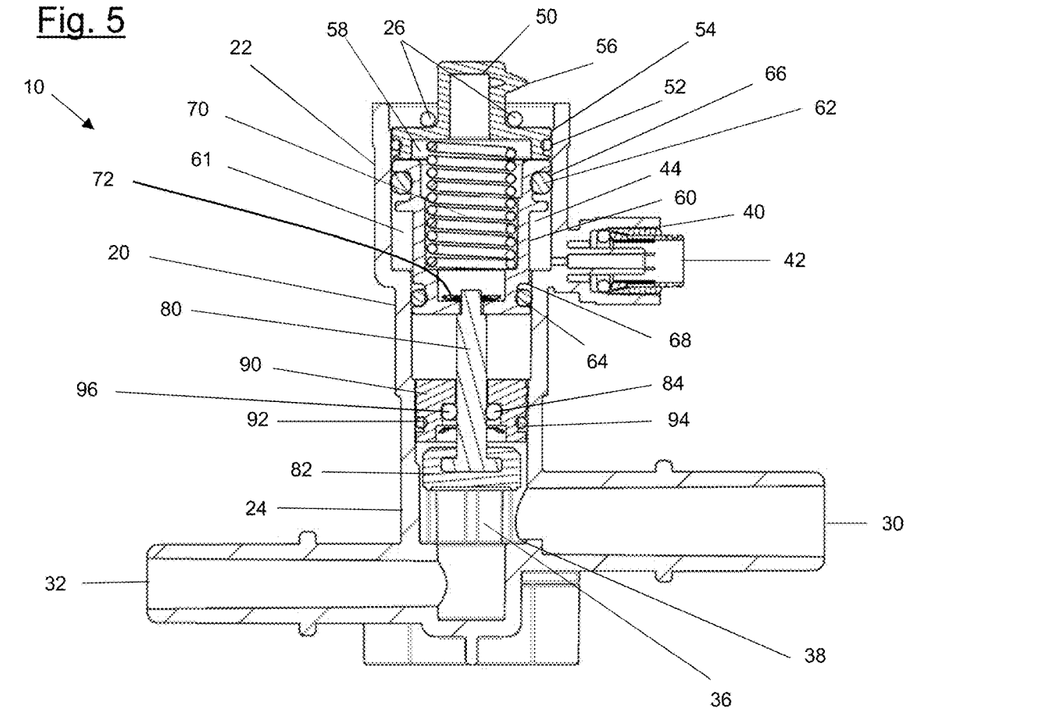
FIG. 5 is a cross-sectional view of the valve of FIG. 1 in an open condition.
Figure 6:
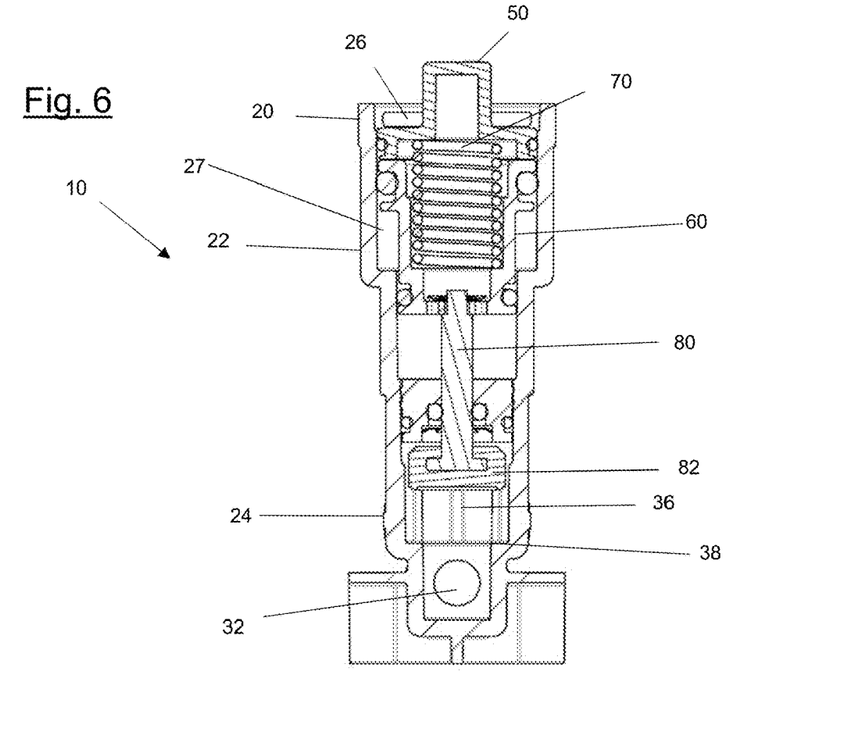
FIG. 6 is an alternate cross-sectional view of the valve of FIG. 1 in an open condition.

The valve 10 is actuated to an open condition by pneumatic actuation. The source of fluid pressure creates a pilot pressure within actuation chamber 44 which drives piston 60 upwards in the piston chamber 61 against the spring 70 force. This draws poppet 82 away from the valve chamber seat 38 as best shown in FIGS. 5 and 6. When the valve 10 is fully open, the poppet 82 is clear of the inlet port 30 and valve chamber 36 and does not interfere with the flow of coolant. This also ensures that the debris tolerance of the valve is a factor of the smallest bore size of the inlet port 30, outlet port 32 or valve chamber 36 and not limited by the poppet 82.

The source of fluid pressure may alternatively be turbo boost air pressure, engine lubricating oil pressure or the pressurized fluid of the coolant system.

The pilot pressure necessary to actuate the piston 60 may be approximately 40 psi.

In use, the O-ring seal 84 may permit a very small quantity of coolant to pass between the stem 80 and the stem guide 90. This is known as weep. By locating the vent tube 56 in the lid 50, at the top of the valve housing 20, the valve 10 benefits from the piston chamber 61 acting as a weep reservoir. Over the lifetime of the valve 10, the valve 10 will not exhibit any coolant leakage due to weep.

Figure 7:
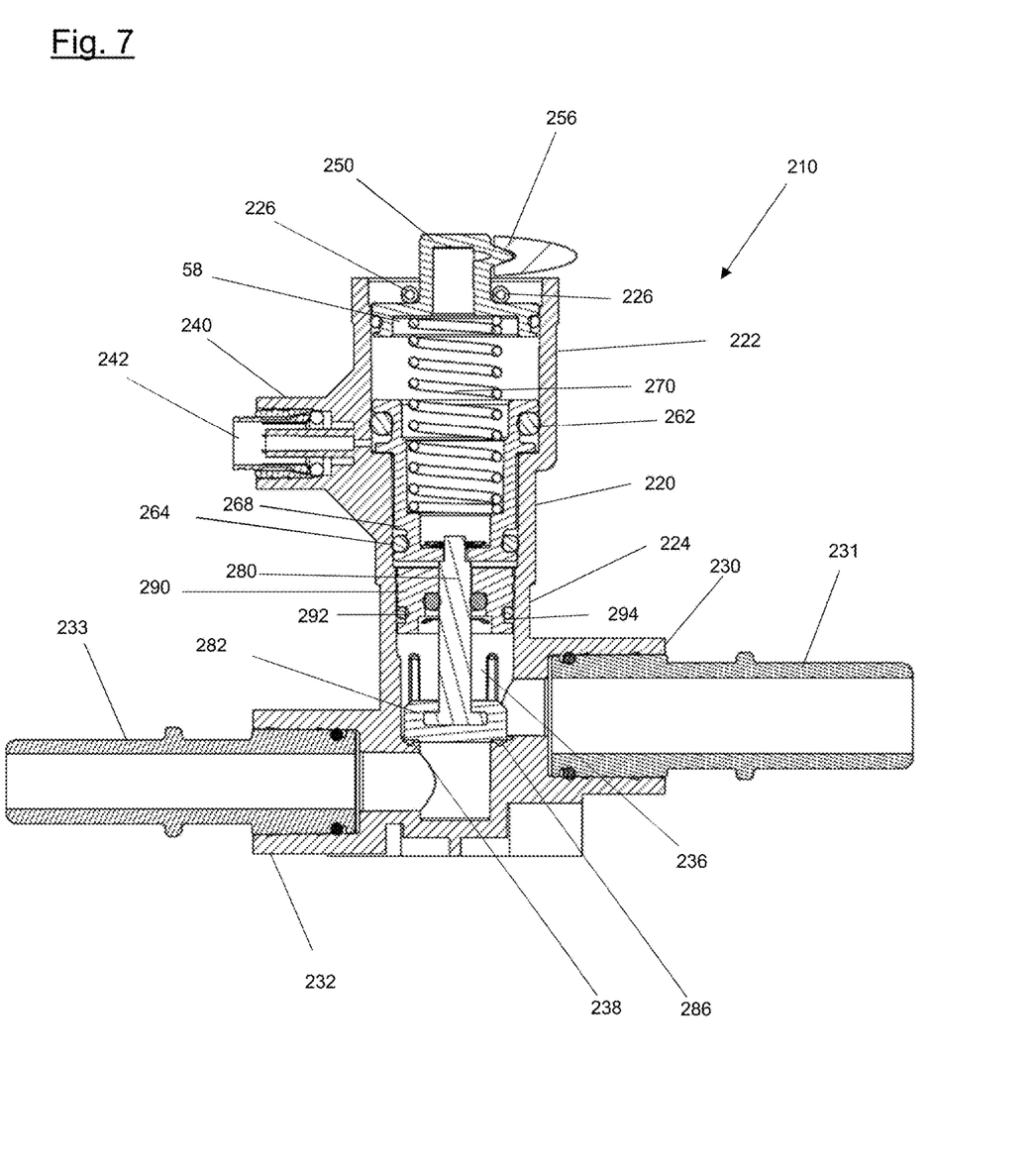
FIG. 7 is a cross-sectional view of an alternate valve in a closed condition.

According to another embodiment of the present invention there is a valve 210 as depicted in FIG. 7.

FIG. 7 shows a valve 210 according to another embodiment. Similar reference numerals have been used for features similar to those described in relation to valve 10, pre-fixed with a "2" to indicate those features as being in relation to valve 210. Only the main differences to valve 10 shall be described in detail.

Valve 210 has a coolant flow portion 224 with an inlet port 230 and an outlet port 232. The inlet port 230 is provided with an inlet port fitting 231. The outlet port 232 is provided with an outlet port fitting 233.

The valve 210 is shown in a closed condition, with the sealing bead 286 of poppet 282 engaged with valve chamber seat 238 to provide a fluid tight seal and prevent flow of coolant from the inlet port 230 to the outlet port 232.

Further embodiments of the coolant control valve are also envisaged.

Figure 8:
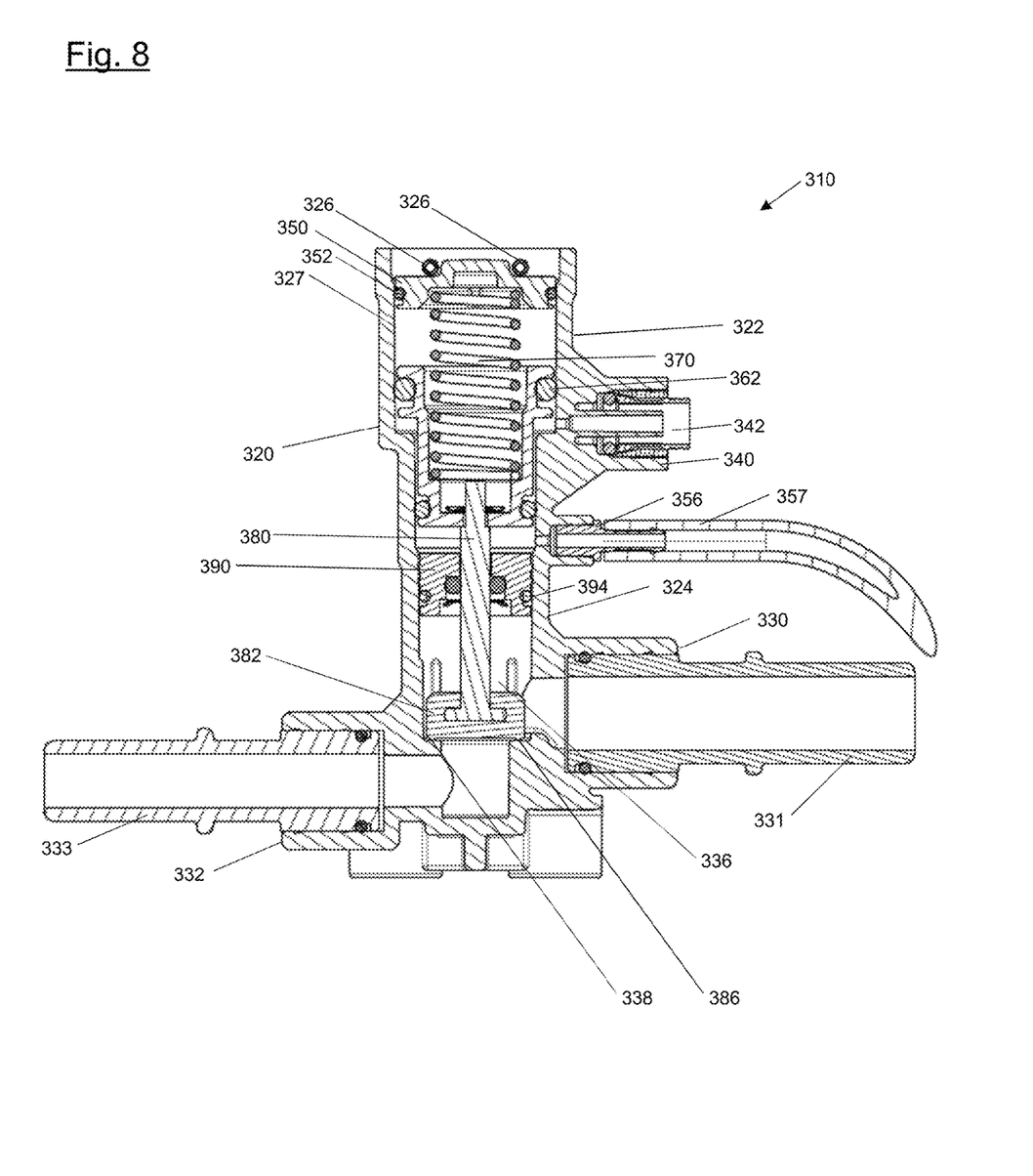
FIG. 8 is a cross-sectional view of an alternate valve in a closed condition.

FIG. 8 shows a valve 310 according to another embodiment. Similar reference numerals have been used for features similar to those described in relation to valve 10, pre-fixed with a "3" to indicate those features as being in relation to valve 310. Only the main differences to valve 10 shall be described in detail.

Valve 310 has a coolant flow portion 324 with an inlet port 330 and an outlet port 332. The inlet port 330 is provided with an inlet port fitting 331. The outlet port 332 is provided with an outlet port fitting 333.

The valve 310 is shown in a closed condition, with the sealing bead 386 of poppet 382 engaged with valve chamber seat 338 to provide a fluid tight seal and prevent flow of coolant from the inlet port 330 to the outlet port 332.

The vent tube 356 is provided in the valve housing 320, between the actuator portion 322 and the coolant flow portion 324. The vent tube 356 is in fluid communication with the piston chamber 361. During installation of the valve 310, a rubber hose 357 or similar is connected to the vent tube 356 so as to direct any weep away from the valve 310, and to prevent ingress of water or debris external to the coolant system.

In the valve 310 closed condition, the piston 360 does not reach the end of the piston chamber 361, such that an inlet to the vent tube 356 is continually exposed.

The invention claimed is:
1. A fluid actuated coolant control valve comprising:
a valve housing;
an inlet port defined within the valve housing, the inlet port configured for fluid communication with one of a coolant source or a heat exchanger of a Diesel Emission Fluid (DEF) tank;
an outlet port defined within the valve housing, the outlet port configured for fluid communication with the other one of the heat exchanger of the DEF tank or the coolant source;
a valve chamber fluidly connecting the inlet port and the outlet port;
a movable valve member;
an actuator configured to actuate the movable valve member, wherein the actuator comprises a fluid actuated piston coupled to the movable valve member and disposed in a piston chamber within the actuator;
a pilot port configured to receive actuation pneumatic fluid to move the fluid actuated piston and the movable valve member coupled thereto;
a vent tube, separate from the pilot port, and configured to vent coolant weeping to the piston chamber from the valve chamber to an external environment of the fluid actuated coolant control valve; and
a lid configured to close an open end of the valve housing to define the piston chamber, wherein the lid is disposed at least partially external to the valve housing, and wherein the lid comprises the vent tube such that the vent tube is disposed external to the valve housing and an orientation of the vent tube is independent of the valve housing,
wherein the movable valve member is biased by a biasing element to a valve closed condition in which a flow of coolant from the inlet port to the outlet port is prevented by the movable valve member in the valve chamber, and
wherein the movable valve member is actuatable, when the actuation pneumatic fluid moves the fluid actuated piston coupled to the movable valve member, to a valve open condition in which the flow of coolant from the inlet port to the outlet port is permitted and the movable valve member is withdrawn from the valve chamber.

2. The fluid actuated coolant control valve according to claim 1, wherein the movable valve member has a sealing bead on a lower surface thereof to facilitate sealing the valve chamber in the valve closed condition.

3. The fluid actuated coolant control valve according to claim 1, wherein the vent tube is provided in an upper portion of the lid.

4. The fluid actuated coolant control valve according to claim 1, wherein the biasing element is a coil spring.

5. The fluid actuated coolant control valve according to claim 1, wherein the valve housing is formed from a single piece.

6. The fluid actuated coolant control valve according to claim 1, wherein the lid is disposed partially within the valve housing and partially external to the valve housing.

7. The fluid actuated coolant control valve according to claim 1, wherein the vent tube is connectable to a hose.

8. The fluid actuated coolant control valve according to claim 7, wherein the hose, when connected to the vent tube, is configured to direct weeping coolant away from the fluid actuated coolant control valve.

9. The fluid actuated coolant control valve according to claim 1, wherein the inlet port has a bore size that is different than a bore size of the outlet port.

10. The fluid actuated coolant control valve according to claim 1, wherein the inlet port has a bore size that is larger than a bore size of the outlet port.

11. The fluid actuated coolant control valve according to claim 1, wherein the valve housing is plastic.

12. The fluid actuated coolant control valve according to claim 1, wherein the lid is plastic.

13. The fluid actuated coolant control valve according to claim 1, wherein the fluid actuated piston is plastic.

14. A coolant control system for a vehicle, the coolant control system comprising a fluid actuated coolant control valve, a coolant source, and a heat exchanger of a Diesel Emission Fluid (DEF) tank, wherein the fluid actuated coolant control valve comprises:
   a valve housing;
   an inlet port defined within the valve housing, the inlet port configured for fluid communication with one of the coolant source or the heat exchanger of the DEF an outlet port defined within the valve housing, the outlet port configured for fluid communication with the other one of the heat exchanger of the DEF tank or the coolant source;
   a valve chamber fluidly connecting the inlet port and the outlet port;
   a movable valve member;
   an actuator configured to actuate the movable valve member, wherein the actuator comprises a fluid actuated piston coupled to the movable valve member and disposed in a piston chamber within the actuator;
   a pilot port configured to receive actuation pneumatic fluid to move the fluid actuated piston and the movable valve member coupled thereto;
   a vent tube, separate from the pilot port, and configured to vent coolant weeping to the piston chamber from the valve chamber to an external environment of the fluid actuated coolant control valve; and
   a lid configured to close an open end of the valve housing to define the piston chamber, wherein the lid is disposed at least partially external to the valve housing, and wherein the lid comprises the vent tube such that the vent tube is disposed external to the valve housing and an orientation of the vent tube is independent of the valve housing,
   wherein the movable valve member is biased by a biasing element to a valve closed condition in which a flow of coolant from the inlet port to the outlet port is prevented by the movable valve member in the valve chamber, and
   wherein the movable valve member is actuatable, when the actuation pneumatic fluid moves the fluid actuated piston coupled to the movable valve member, to a valve open condition in which the flow of coolant from the inlet port to the outlet port is permitted and the movable valve member is withdrawn from the valve chamber.

15. A Diesel Emission Fluid (DEF) system for a diesel-powered vehicle having a coolant control valve, the coolant control valve comprising:
   a valve housing;
   an inlet port defined within the valve housing, the inlet port configured for fluid communication with one of a coolant source or a heat exchanger of a DEF tank;
   an outlet port defined within the valve housing, the outlet port configured for fluid communication with the other one of the heat exchanger of the DEF tank or the coolant source;
   a valve chamber fluidly connecting the inlet port and the outlet port;
   a movable valve member;
   an actuator configured to actuate the movable valve member, wherein the actuator comprises a fluid actuated piston coupled to the movable valve member and disposed in a piston chamber within the actuator;
   a pilot port configured to receive actuation pneumatic fluid to move the fluid actuated piston and the movable valve member coupled thereto;
   a vent tube, separate from the pilot port, and configured to vent coolant weeping to the piston chamber from the valve chamber to an external environment of the coolant control valve; and
   a lid configured to close an open end of the valve housing to define the piston chamber, wherein the lid is disposed at least partially external to the valve housing, and wherein the lid comprises the vent tube such that the vent tube is disposed external to the valve housing and an orientation of the vent tube is independent of the valve housing,
   wherein the movable valve member is biased by a biasing element to a valve closed condition in which a flow of coolant from the inlet port to the outlet port is prevented by the movable valve member in the valve chamber, and
   wherein the movable valve member is actuatable, when the actuation pneumatic fluid moves the fluid actuated piston coupled to the movable valve member, to a valve open condition in which the flow of coolant from the inlet port to the outlet port is permitted and the movable valve member is withdrawn from the valve chamber.

16. A vehicle having a Diesel Emission Fluid (DEF) system, the DEF system having a coolant control valve comprising:
   a valve housing;
   an inlet port defined within the valve housing, the inlet port configured for fluid communication with one of a coolant source or a heat exchanger of a DEF tank;
   an outlet port defined within the valve housing, the outlet port configured for fluid communication with the other one of the heat exchanger of the DEF tank or the coolant source;
   a valve chamber fluidly connecting the inlet port and the outlet port;
   a movable valve member;
   an actuator configured to actuate the movable valve member, wherein the actuator comprises a fluid actuated piston coupled to the movable valve member and disposed in a piston chamber within the actuator;
   a pilot port configured to receive actuation pneumatic fluid to move the fluid actuated piston and the movable valve member coupled thereto;
   a vent tube, separate from the pilot port, and configured to vent coolant weeping to the piston chamber from the valve chamber to an external environment of the coolant control valve; and
   a lid configured to close an open end of the valve housing to define the piston chamber, wherein the lid is disposed at least partially external to the valve housing, and wherein the lid comprises the vent tube such that the vent tube is disposed external to the valve housing, and an orientation of the vent tube is independent of the valve housing,
   wherein the movable valve member is biased by a biasing element to a valve closed condition in which a flow of coolant from the inlet port to the outlet port is prevented by the movable valve member in the valve chamber, and
   wherein the movable valve member is actuatable, when the actuation pneumatic fluid moves the fluid actuated piston coupled to the movable valve member, to a valve open condition in which the flow of coolant from the inlet port to the outlet port is permitted and the movable valve member is withdrawn from the valve chamber.

* * * * *